United States Patent [19]
Tanie

[11] 3,963,866
[45] June 15, 1976

[54] SYSTEM FOR DETERMINING THE CONTOUR OF A PLANE FORM

[75] Inventor: Kazuo Tanie, Yokohama, Japan

[73] Assignee: Agency of Industrial Science & Technology, Tokyo, Japan

[22] Filed: Sept. 11, 1973

[21] Appl. No.: 396,326

[30] Foreign Application Priority Data
Sept. 11, 1972 Japan............................ 47-91574

[52] U.S. Cl. ........................... 178/7.2; 178/DIG. 34; 178/DIG. 36
[51] Int. Cl.² ..................................... H04N 5/38
[58] Field of Search ............... 178/DIG. 31, 34, 36, 178/7.2 R; 356/156, 167; 250/222 R, 559–561; 340/146.3 AE

[56] References Cited
UNITED STATES PATENTS

| | | | |
|---|---|---|---|
| 3,173,015 | 3/1965 | Moneypenny et al. | 250/222 R |
| 3,244,810 | 4/1966 | Williams | 178/6.8 |
| 3,566,129 | 2/1971 | Bardwell | 250/559 |

*Primary Examiner*—Robert L. Griffin
*Assistant Examiner*—Aristotelis M. Psitos
*Attorney, Agent, or Firm*—Kurt Kelman

[57] ABSTRACT

Disclosed is a system for determining the contour of a plane form in which system the plane form is exposed to an industrial television camera; the video signal from the camera is converted into a train of binary signals "1" or "0", depending on whether a sampling point is bright or dark on the photo-electric converting plane of the camera; and the contour of the plane form is determined from the incremental length of the camera movement relative to the plane form or from the amount of the phase-shift of the sampling pulse required for causing the inversion of binary signals at the sampling points close to the contour of the plane form.

15 Claims, 9 Drawing Figures

Fig. 7

STATE OF "L₁" & "L₂" STORED IN CPU

| ADDRESS | $L_1$ | $L_2$ |
|---|---|---|
| $a_1$ | $L_{11}$ | $L_{21}$ |
| $a_2$ | $L_{12}$ | $L_{22}$ |
| $a_3$ | $L_{13}$ | $L_{23}$ |
| $a_4$ | $L_{14}$ | $L_{24}$ |
| ⋮ | ⋮ | ⋮ |
| $a_i$ | $L_{1i}$ | $L_{2i}$ |
| ⋮ | ⋮ | ⋮ |
| $a_n$ | $L_{1n}$ | $L_{2n}$ |

$i$ : NUMBER OF SAMPLING LINE $L_1$, $L_2$ : SEE FIG. 1

SYSTEM FOR DETERMINING THE CONTOUR OF A PLANE FORM

BACKGROUND OF THE INVENTION

This invention relates to a system for determining the contour of a plane form or a two-dimensional pattern.

In determining the contour of a plane form in the prior art, the photo-electric converting plane of an industrial television camera (hereinafter abbreviated to "ITV camera") which is exposed to the plane form, is divided into thousands of minute sections, and a logical operation of spacial differentiation is performed relative to each section to determine the contour of the plane form. Therefore, the accuracy rate depends on the number of sections into which the plane form is divided. Stated otherwise, precision data cannot be obtained without increasing the number of sections, hence requiring a large storage capacity in an associated buffer memory and large data-processing capability in an associated electronic computer. Thus, the system for determining the contour of a plane form has been inevitably large in size, of complex structure and difficult to handle.

It has been proposed that the contour of a plane form be determined with reference to the reciprocity between two different images of the same plane form appearing on two ITV cameras. Also, it has been proposed that a plane form be exposed to laser, and be triangulated.

However, these proposed methods require determination of individual points on the contour of the plane form, and therefore these methods inherently require very tedious work in obtaining precision data.

The object of this invention is to provide a system which can determine the contour of a plane form from a reduced number of sampling points with full accuracy and which therefore does not require a large processing capability in an associated electronic computer.

SUMMARY OF THE INVENTION

To attain the above object, accordng to this invention there is provided a system for determining the contour of a plane form in which system the output signal from an ITV camera is converted into a train of binary signals "1" or "0", depending on whether a sampling point is bright or dark on the photoelectric converting plane of the ITV camera, and the contour of the plane form is determined from the incremental length of the camera movement relative to the plane form or from the amount of the phase-shift of the sampling pulse required for causing the inversion of binary signals at the sampling points close to the contour of the plane form. A reduced number of sampling points are sufficient to obtain contour determination with good accuracy, and an electronic computer of a large processing capacity is not required.

Other objects and advantages of this invention will be apparent from the following description which is made with reference to the accompanying drawings wherein:

FIG. 7 shows the state in which data are stored in an associated electronic computer.

Referring to FIG. 1A, a plane form or two-dimensional pattern is shown as a circle "H". A plurality of points $x_1, x_2, \ldots x_i, \ldots x_n$ and $y_1, y_2, \ldots y_i, \ldots y_n$ are equally spaced respectively on the X and Y axes in the area of the photo-electric converting plane of an ITV camera, thus permitting a position or sampling point in the sweeping area to be given in terms of "$x_i$" and "$y_i$". As described later the information which is contained at a sampling point is given in such a binary form that:

A sampling point when bright, provides the binary signal "1", whereas a sampling point when dark provides the binary signal "0". Assuming that the inside of the circle "H" is bright, whereas the outside of the circle "H" is dark, every sampling point within the circle will provide the binary signal "1", and every sampling point outside the circle will provide the binary signal "0". Referring to FIG. 1B, there is shown an electric signal composed of a train of pulses which appear in the course of sweeping along a horizontal line in the ITV camera. As seen from this figure, a pulse or binary signal "1" appears every time a sweeping beam passes by each sampling point within the circle, but no pulse or binary signal "0" appears when a sweeping beam passes beyond the contour of the circle. In FIG. 1A, each sampling point indicated by the symbol "$x$" provides the binary signal "1". The other sampling points bearing no symbol provide the binary signal "0".

Figure 2:
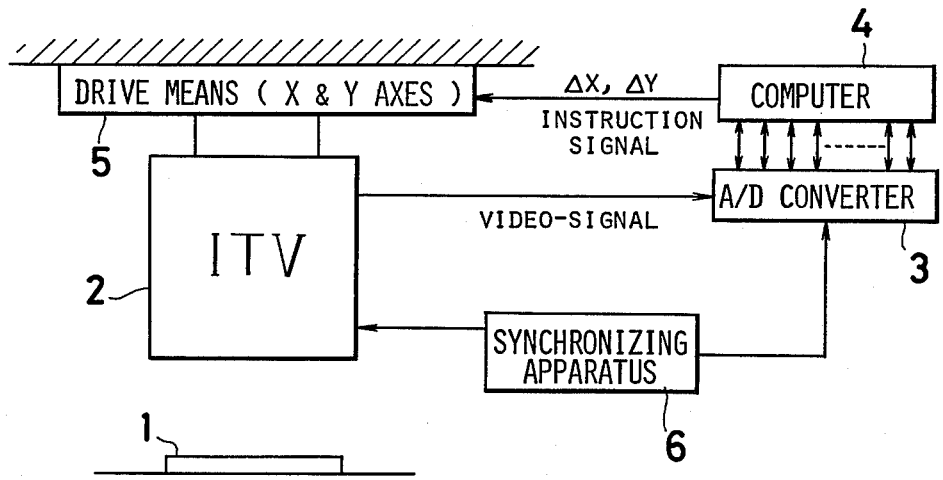
FIG. 2 is a block diagram of a first type embodiment of this invention.

Referring to FIG. 2, there is shown a first type embodiment of this invention. 1 is a pattern or plane form the contour of which is to be determined. 2 is an ITV camera, and 3 is an analog-to-digital converter at the interface, which converter is used for changing a video-signal pertaining to the sampling points to an electric signal composed of binary signals "0" or "1". 4 is an electronic computer to store and process the electric binary signals representing the plane pattern. 5 is a drive means for moving an ITV camera along the X or Y axis. 6 is a synchronizing apparatus. Assume that in operation, the ITV camera moves $\Delta x_1$ left along the X axis or in the horizontal direction. In a relative sense the pattern moves the same distance right on the photoelectric converting plane of the ITV camera. Suppose that as a result, for instance, an output signal relative to a particular sampling point $A_1$ ($x_2$, $y_i$) changes from being dark (or binary signal "0") to being bright (or binary "1"). Suppose that an ITV camera moves $\Delta x_2$ left in the horizontal direction, and that an output signal relative to a rather particular sampling point $A_2$ ($x_i$, $y_i$) changes from "1" to "0".

Now, the abscissas $L_1$ and $L_2$ at the crossing points between the horizontal sweeping line and the contour of the pattern, are given in the following equations:

$$L_1 = l \; \frac{s_1 - 1}{n - 1} + \Delta x_1 \qquad (1)$$

$$L_2 = l \; \frac{(s_1 + s_2) - 1}{n - 1} + \Delta x_1 \qquad (2)$$

where "*l*" is the full length of the horizontal sweeping line, "*n*" is the number of the sampling points $x_0$–$x_{n-1}$, and "$s_1$" is the number of binary data of one type, namely, in this embodiment, the number of binary "0"'s counting on line "$y_i$" up to the point close to the contour of the pattern. This is stored in the electronic computer (see FIG. 1(A)), "$s_2$" is the number of binary data of the other type, namely the binary "1"'s on line "$y_i$" within the pattern which is also initially stored, and finally, "$s_3$" is the number of the binary data of the type on line "$y_i$" on the remaining horizontal length outside the pattern which is also initially stored.

The above operation is repeated on each of the sweeping lines "$y_1$" to "$y_n$", and then each crossing point "E" between a horizontal sweeping line and the contour of the pattern "H" can be easily determined from the above equations (1) and (2). In a similar way, the ITV camera 2 is moved parallel with the "Y" axis or in the vertical direction by the drive means 5, then likewise, the ordinates at the crossing points "F" between the vertical sampling lines "$x_0$" to "$x_{n-1}$" and the contour of the pattern "H" can be determined (see FIG. 1(C)). When the electronic computer 4 completes processing of the data thus obtained, the shape of the pattern "H" can be precisely measured without touching the pattern.

Figure 1:
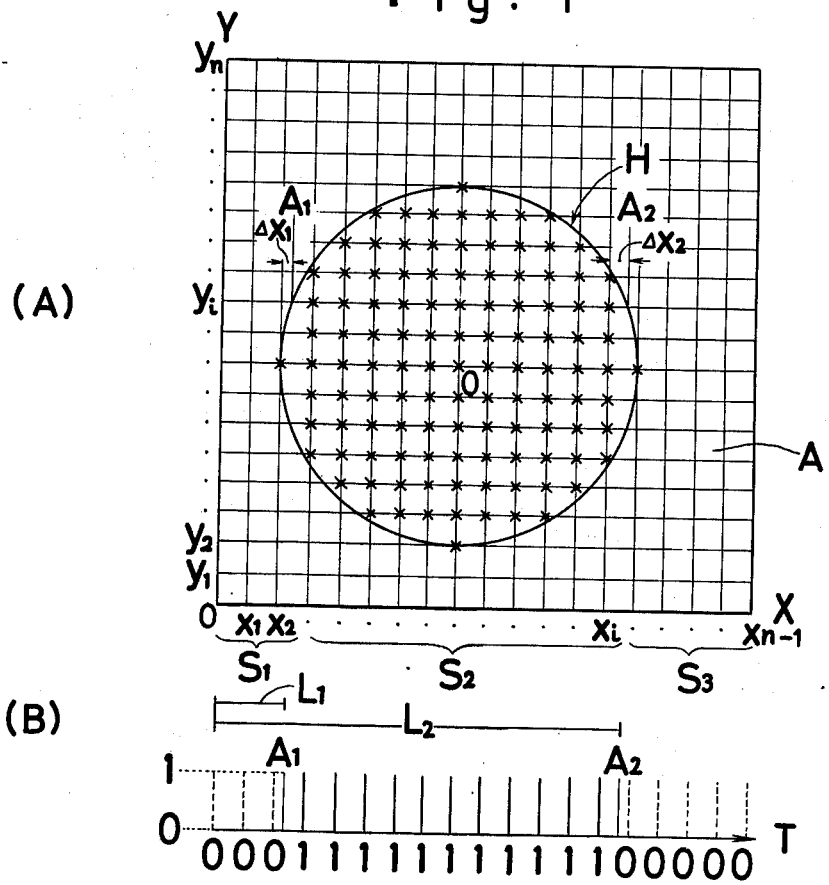
FIGS. 1A, 1B and 1C show the principle of this invention according to which the contour of a two-dimensional pattern or plane form is determined.
Figure 3:
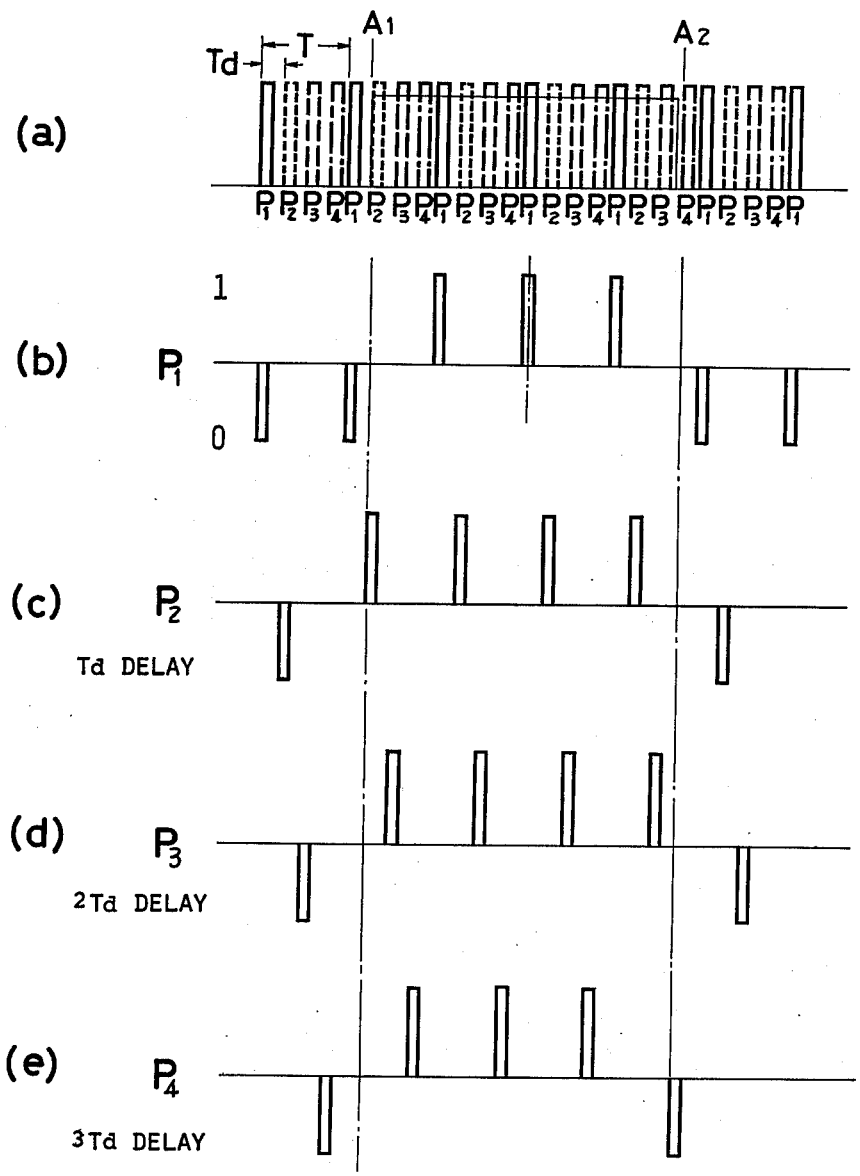
FIG. 3 shows different wave forms to indicate the contour of the pattern in a second embodiment of this invention.

Referring to FIG. 3, there is shown a different type embodiment in which the electric wave form relative to the sampling points on a sampling line are phase-shifted instead of moving the ITV camera. Particularly, in FIG. 3(a) there are shown four different pulse trains. The pulses in the first pulse train are denoted $P_1$, those in the second pulse train $P_2$, and those in the third and fourth pulse trains $P_3$ and $P_4$ respectively. The pulses $P_1$, of the first pulse train are herein referred to as sampling signals, while the pulses in the second, third and fourth pulse trains constitute incremental distance signals. The points along line $y_i$ which, when sampled, result in the furnishing of pulses $P_1$ are herein referred to as sampling points. Points $A_1$ and $A_2$ in FIG. 3a indicate two points on line "$y_i$" on the contour of the plane form. These are referred to as contour points herein. In FIGS. 1 and 3, for the sake of explanation, the negative pulses are shown as corresponding to the binary "0", whereas the positive pulses are shown as corresponding to the binary "1". In FIG. 3, the output pattern of a train of pulses $P_1$ which represents the state of the sampling points ($x_0$, $y_i$) to ($x_{n-1}$, $y_i$) is the same as that which is obtained before the ITV camera is moved $\Delta x$ in the first operation above mentioned with reference to FIG. 1. In the first operation (FIG. 1b) the ITV camera is moved, resulting in the inversion of the binary data at the particular points close to the contour of the plane form. Thus, the positions of such particular points are detected. Contrary to this, in the operation as shown in FIG. 3, different trains of pulses $P_2$, $P_3$, $P_4$ phase-shifted relative to each other are used to detect the contour of the plane form while the ITV camera is kept still.

Specifically, a second train of pulses $P_2$ is phase-shifted or delayed from the first train of pulses $P_1$ by "Td", and the output pattern of the second train of pulses is shown in FIG. 3(c). A third train of pulses $P_3$ is phase-shifted by "2Td" relative to the first train of pulses $P_1$, and the output pattern of the third train of pulses is shown in FIG. 3(d). FIG. 3(e) shows the output pattern of the fourth train of pulses $P_4$, which is phase-shifted or delayed by "3Td" relative to the first train of pulses. In each of these trains of pulses the polarity of some of pulses is inverted at the contour "$C_1$" or "$C_2$" of the plane form. As seen from FIGS. 3(b) to 3(e), one crossing point between "$y_i$" and the contour "$C_1$" of the pattern is at the distance corresponding to the phase shift "Td" from the reference position determined by the first train of pulses $P_1$, whereas the other crossing point "$C_2$" is at the distance corresponding to "3Td" from the reference position. Now, the abscissas "$L_1$" and "$L_2$" of the crossing points between line "$y_i$" and the contour of the plane form as viewed from the left end are given by the following equations:

$$L_1 = \frac{l}{n-1}(s_1 - 1 + \frac{\alpha_1 Td}{T})  \quad (3)$$

$$L_2 = \frac{l}{n-1}\left\{(s_1 + s_2) - 1 + \frac{\alpha_2 Td}{T}\right\} \quad (4)$$

where "*l*" is the length of the sweeping line; "*n*" is the number of the sampling points $x_0$–$x_{n-1}$; "$\alpha_1$" and "$\alpha_2$" are the shifting amount required for inverting the pulses close to the contour points; "T" is the period of pulse; "Td" is the phase difference between adjacent trains of pulses, wherein referred to as a determined time interval, and finally "$s_1$", "$s_2$" and "$s_3$" are the number of binary "0"'s and "1"'s as found in the initial sweep and as counted from the left end.

This operation is repeated on each of the sweeping lines "$y_1$" to "$y_n$", and then data of the horizontal crossing points "E" result. Then, the same operation is repeated relative to the sampling lines "$x_0$" to "$x_{n-1}$", and data of the vertical crossing points "F" result. Thus, the contour or shape of the pattern "H" is determined from these data when handled by the electronic computer.

Figure 4:
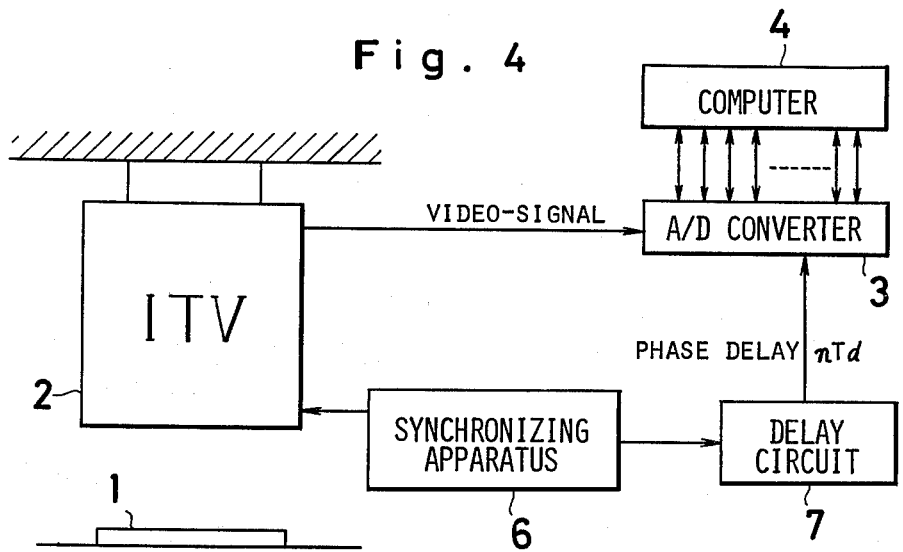
FIG. 4 is a block diagram of the second embodiment of this invention.

Referring to FIG. 4, there is shown a second type system of this invention. 1 is a plane pattern, 2 an ITV camera, 3 an analog-to-digital converter at the interface, 4 an electronic computer, 6 a synchronizing apparatus and 7 a phase shift or delay circuit. The phase shift circuit is used to shift the phase of pulses supplied from an oscillator (not shown).

In either of the first and second type systems the number of the sampling points and that of the sweeping lines can be one, although the travelling distance of the camera will be long, or the phase shift of the sampling pulses will be large. As is readily understood, the number of the sampling points and/or the number of the sweeping lines may be arbitrarily determined with reference to the size of the plane form and the precision required for contour determination and other factors. The above embodiments are described with reference to a circle, but this invention can be equally applied to determine the contour of any plane form other than the circle.

Figure 5:
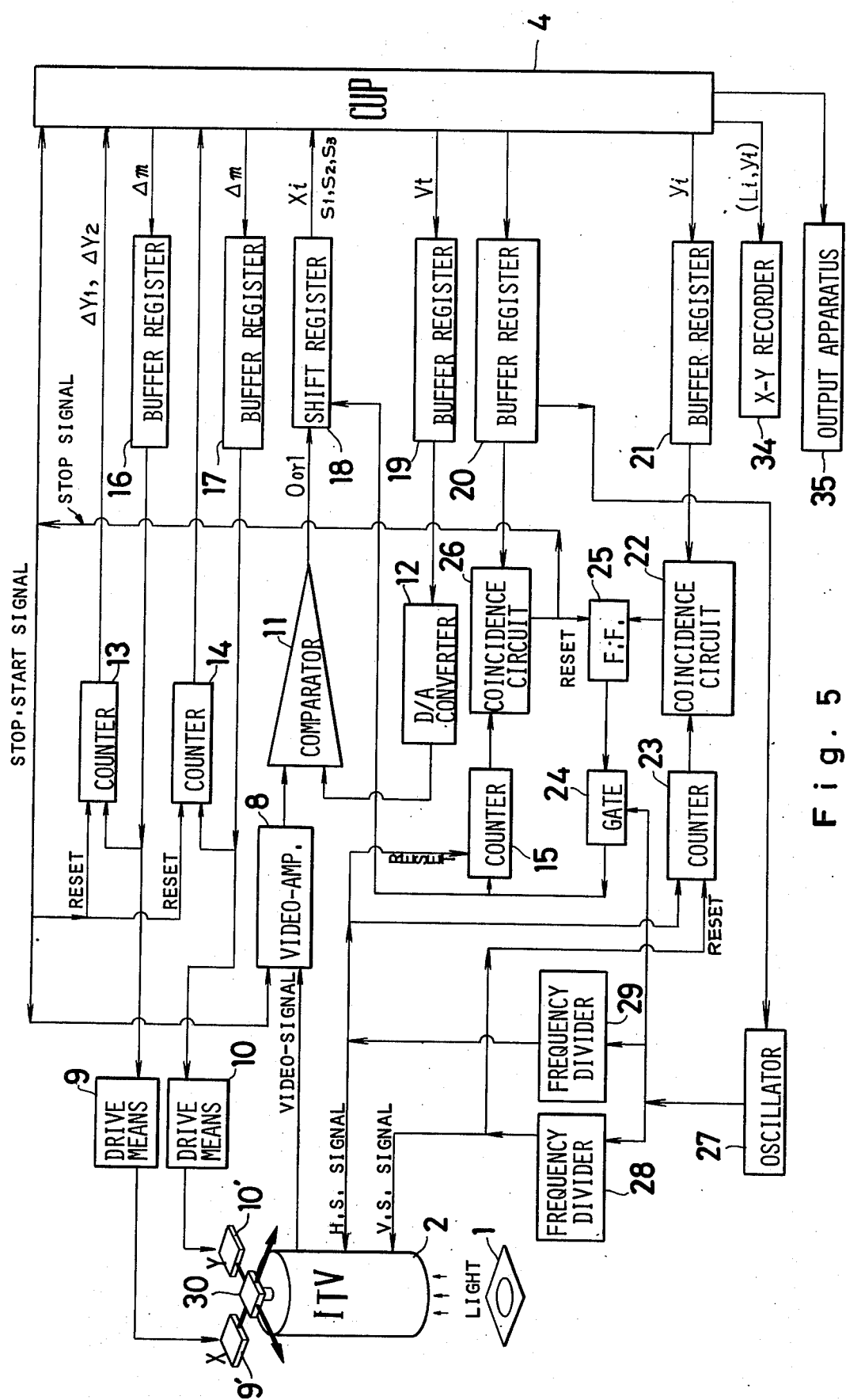
FIG. 5 is a detailed block diagram of the first embodiment.

Referring to FIG. 5, there is shown the first type system in detail. An oscillator 27 supplies pulses to perform sampling on the vertical and horizontal sweeping lines. As is well known, an electron beam is made to sweep the photo-electric converting plane of the ITV camera by horizontal synchronizing pulses whose repetition rate is several hundred times as large as the repetition rate of the vertical synchronizing pulses. The time in which a single sweeping line runs across the photo-electric converting plane, is equal to the period of the horizontal synchronizing pulse. If sampling is performed, for instance, at ten different points on a single horizontal sweeping line, it is necessary that the oscillator 27 provides pulses of a repetition rate ten times as great as the horizontal synchronizing pulse. The frequency of the oscillator 27 is controlled, depending on the value set in a buffer register 20. As is readily understood, the frequency of the oscillator is determined with reference to the number of the sampling points on the sweeping line. The output pulses from the oscillator are divided by frequency dividers 28 and 29 so that as many sampling points as required may be obtained. The vertical and horizontal synchronizing pulses thus obtained are supplied to the ITV camera 2 to sweep the photo-electric converting plane thereof. A buffer register 21 gives an instruction as to the sweeping line on which a sampling is to be performed. The value "$y_1$" is set in the buffer register 21. In a coincidence circuit 22 the value "$y_i$" is compared with the horizontal synchronizing signal from the frequency divider 29. More specifically, when the output from a counter 23 to which the horizontal synchronizing pulses are supplied, is in agreement with the output from the buffer register 21, the concidence circuit 22 provides an output pulse to a flip-flop circuit 25, thus setting the flip-flop circuit 25. As a result an "AND" gate 24, to which output pulses from the oscillator 27 are continuously supplied, is opened, thus allowing the pulses from the oscillator 27 to pass to a shift register 18 as shift pulses. As mentioned earlier, the output pulses from the oscillator after frequency division, are supplied to the ITV camera 2 as horizontal and vertical synchronizing pulses. The ITV camera 2 scans the plane form 1 by means of synchronizing signals and supplies video-pulses to a comparator circuit via a video-amplifier 8 while scanning is being performed on the plane form. The video signals from the ITV camera are compared with a given set value "$V_t$" in the form of an electric signal. This set value "$V_t$" is supplied from an electronic computer 4 via a threshold buffer register 19 and a digital-to-analog converter 12. When the amplitude of the video signals is larger than the set value "$V_t$", the comparator circuit 11 provides the binary "1" signal, and when the amplitude of the video signals is smaller than the set value "$V_t$", the comparator circuit 11 provides the binary "0" signal. The binary signals are sampled by the shift pulses and sequentially stored in the shift register 18. Samplings are conducted as many times as predetermined by the buffer register 20. More specifically, the output pulses from the oscillator 27 are counted by a counter 15, and when the count result is in agreement with the sampling number given by the buffer register 20, the coincidence circuit provides an output pulse. Then the flip-flop circuit 25 is reset, thus stopping sampling and at the same time closing the "AND" gate 24. At the same time, a "STOP" signal is sent from the coincidence circuit 26 to the electronic computer 4 and the video-amplifier 8. Thus, the supply of video pulses from the video-amplifier 8 to the comparator 11 ceases, and the data pulses which have been shifted to the shift register 18 are stored in the electronic computer 4. The position at which the binary inversion "1" to "0" or "0" to "1" has taken place are stored along with "$s_1$", "$s_2$", "$s_3$", sampling number "$n$" and length of sweep "$l$". Then, the electronic computer 4 sends to an ITV horizontal drive means 9 via a camera shift amount instruction register 16 a signal to instruct movement $\Delta m$ of the ITV camera along the X-axis. The drive means 9 such as a step motor moves the ITV camera by "$\Delta m$", and then the sampling procedure as mentioned above proceeds. The data thus obtained is compared with those initially stored in the electronic computer, thus examining whether the position of the binary inversion is changed or not. If no change is confirmed, the ITV camera is made to move another $\Delta m$, and then the sampling proceeds. This operation is repeated until the change in the position of the binary inversion has taken place. Then, the counter 14 gives the total length of incremental movement of the camera, and the abscissas, $L_1$ and $L_2$ are determined from equations (1) and (2). Thus, the contour determination relative to a single sweeping line is completed, and the whole system proceeds to determine the contour of the plane form relative to a subsequent horizontal sweeping line. The horizontal contour determination is completed, and then the vertical contour determination will proceed in a similar way. Thus, the crossing points between the horizontal and vertical sweeping lines and the contour of the plane form are located. The information given in the table relative to the position of the contour of the plane form (See FIG. 7) is stored in the electronic computer 4. The values in this table are sent to an X—Y recorder to reproduce the contour of the plane form with high precision. If such information is sent to an output apparatus 35 such as an industrial robot, it can grasp the instantaneous position or shape of a working object, and can proceed with the subsequent procedure at a proper moment.

Figure 6:
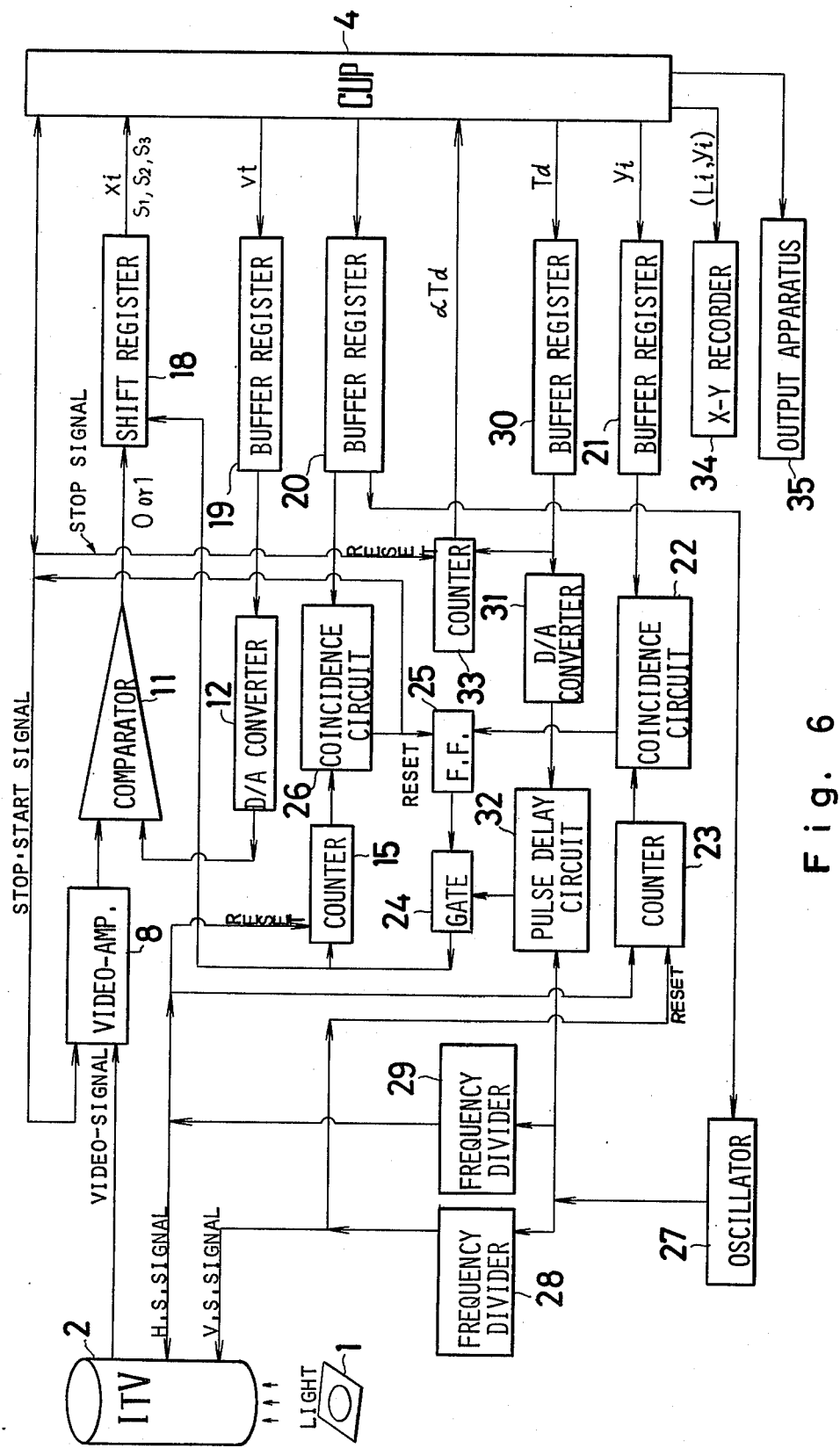
FIG. 6 is a detailed block diagram of the second embodiment.

Referring to FIG. 6, the contour determination by pulse phase shifting is described. Data relative to the horizontal (or vertical) sweeping line initially appearing on an ITV camera (i.e., data relative to the positions of binary inversion from binary "0" to "1" or from binary "1" to "0"), "$s_1$", "$s_2$", "$s_3$", the sampling number "$n$", and the pulse period "T" are stored in the electonic computer 4. An oscillator 27 is connected to a pulse delay circuit 32. The electronic computer 4 sends a delay instruction signal to the pulse delay circuit 32 via an incremental phase shift instruction buffer register 30 and a digital-to-analog converter 31. The pulse delay circuit is responsive to the signal to cause the phase of pulses from the oscillator to shift by the unit amount "Td". The pulses thus delayed are sent to a shift register 18 as shift pulses. Then the sampling is performed, and the data thus obtained is compared with the initial data to examine whether the change in the position of the binary inversion has taken place or not. If not, the phase of sampling pulses is made to shift by another unit amount "Td". This operation is repeated until the change in the binary inversion has taken place. The counter 33 gives the total of the unit increments "Td", herein referred to as incremental distance signals, and the abscissas "$L_1$" and "$L_2$" are determined from equations (3) and (4). Thus, the crossing points between the horizontal (or vertical) sweeping lines and the contour of the plane form are determined.

Figure 8:
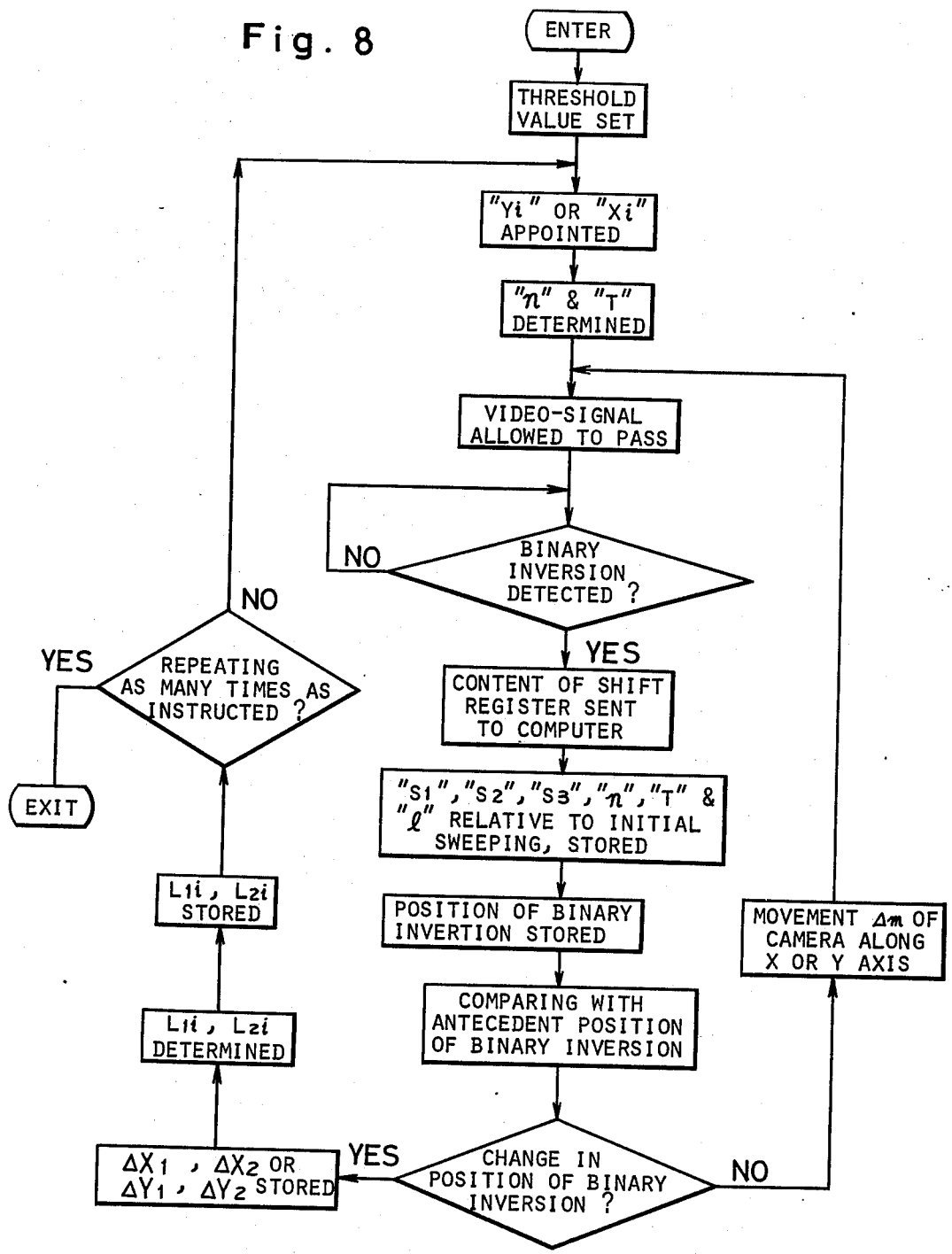
FIG. 8 and FIG. 9 show the flow-sheets for processing data in the electronic computer according to the principle of this invention.
Figure 9:
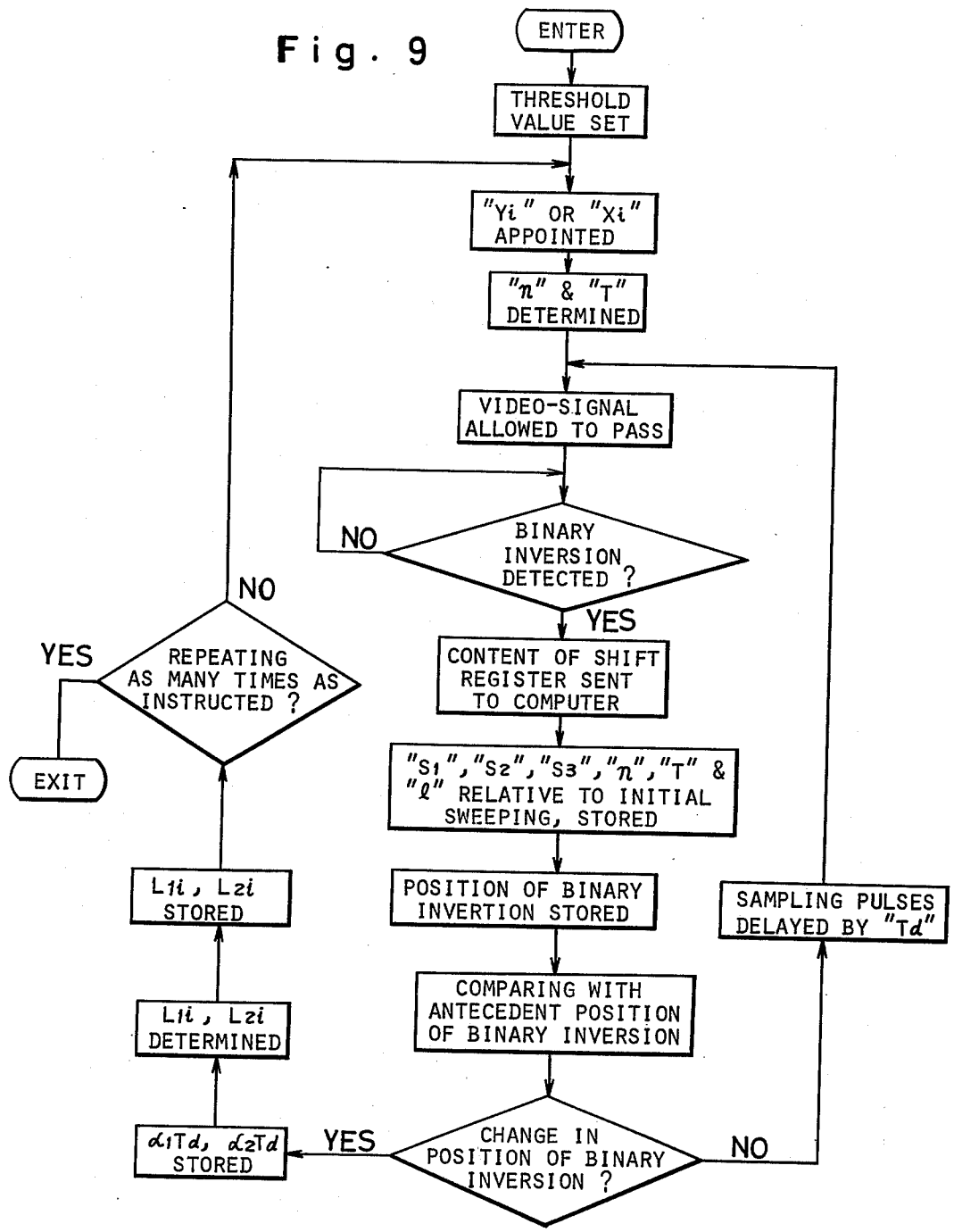

In the electronic computer the logic operation proceeds according to the flow sheet as shown in FIG. 8 or 9.

First, in a threshold value register a reference voltage is set to select video signals with reference to brightness. Also, predetermined values of the sampling number and the pulse period is set, and the instruction as to which sweeping line is sampled, is stored in a buffer register. Then, a start signal is sent to the video amplifier, thus allowing video signals to pass to the comparator and the shift register. After sampling is repeated as many times as instructed, the coincidence circuit generates a stop signal. In response to this stop signal the electronic computer prevents video signals from passing through the video amplifier, and then the electronic computer reads the data stored in the register, and at the same time it stores different data "$s_1$", "$s_2$", "$s_3$", "$n$" and "$l$". The electronic computer studies the particular arrangement of data in the shift register to determine and store the position of the binary inversion from binary "0" to "1" or from binary "1" to "0". The electric computer 4 sends a camera-shift instruction signal to a drive means. In response to the instruction signal the drive means moves the camera $\Delta m$ parallel with the X or Y axis, and then the electronic computer sends a start signal to the video amplifier 8, thus allowing the video signal to pass to the comparator 11 and to the shift register, and performing as many samplings as instructed. The data thus stored in the shift register is compared with the initial data prior to the camera movement to examine whether a change in the position of the binary inversion from "0" to "1" and vice versa has taken place or not. If not, the ITV camera will be moved $\Delta m$, and sampling proceeds for the new position of the ITV camera. This operation is repeated until a change in the position of the binary inversion occurs. Then, the counter gives the total number of the incremental movements of the ITV camera, and hence the total distance $\Delta x_1$, $\Delta x_2$ (or $\Delta y_1, \Delta y_2$) of camera movement. The abscissas $L_1 i_1$ and $L_2 i_2$ can be found from the equations (1) and (2), and the results are stored in the electronic computer.

A similar procedure is taken in the contour determination by pulse phase shifting (See FIG. 9). The position of the binary inversion from "0" to "1" and vice versa which is determined in the first sampling of a given sweeping line is stored as a reference, and a delay circuit is responsive to a delay instruction signal to cause the sampling pulses to delay by the unitary time of "Td". The sampling pulses thus delayed are passed to the shift register. The data thus obtained is compared with the initial data to example whether a change in the position of the binary inversion from "0" to "1" and vice versa has taken place. If there is no change, another sampling proceeds by means of sampling pulses phase-shifted by "2Td" relative to the first sampling pulses. If there is a change, the instantaneous phase shift $\alpha Td$ is determined, and then the abscissas $L_1 i$, $L_2 i$ are determined from the equations (3) and (4), and the results are stored in the electronic computer.

The conventional contour determination system cannot improve the precision in contour determination without increasing the number of sampling lines and sampling points, hence requiring an electronic computer of large capacity. Compared with this, the contour determination system according to this invention requires only an electronic computer of small capacity in spite of high precision in contour determination, thanks to its unique art of incremental movement of the ITV camera or of incremental phase-shift of sampling pulses.

The contour determination system of this invention if applied to of the "trucing" of a circle, eliminates the tedious centering operation which otherwise would be required. If a magnifying glass is attached to an associated ITV camera, the contour determination system of this invention can easily be calibrated to a high accuracy without touching. If the contour determination system of this invention is applied to the "eye" of an industrial robot, the industrial robot can grasp the shape of a workpiece or the position of an object, and therefore the industrial robot can perform precise assembling operations which require precise control for instance, in positioning male parts relative to female parts, such as fitting a piston rod into a cylinder.

What is claimed is:

1. Method for generating distance signals signifying the distance along a line from a determined starting location of contour points on the contour of a plane form on a background surface, said surface having a first scannable characteristic value at points inside said contour and a second scannable characteristic value at points outside of said contour, comprising in combination, the steps of scanning said line in a predetermined direction and creating a plurality of sampling signals each having a first or second characteristic signal value in correspondence to the value of said scannable characteristic at a corresponding one of a plurality of sampling points spaced at predetermined equal intervals along said line, whereby a change from said first to said second characteristic signal value occurs following the one of said scanning signals created at the one of said sampling points immediately preceeding the first of said contour points in said predetermined direction along said line; creating incremental distance signals at predetermined incremental distances each less than one of said predetermined equal intervals along said line from said one of said sampling points until a so-created incremental distance signal has said second characteristic signal value; and computing said distance signal as a function of the number of sampling signals preceding said one of said sampling signals and the number of incremental distance signals following said one of said sampling signals.

2. A method as set forth in claim 1, wherein said step of creating incremental distance signals comprises creating incremental distance signals at determined incremental distances along said line from each of said sampling points until a so-created incremental distance signal following said one of said sampling points has said second characteristic signal value.

3. A method as set forth in claim 2, wherein said contour has a first and second contour point along said line; wherein said distance signals includes a first and second distance signal signifying the distance along said line from a determined starting location of said first and second contour point respectively; wherein the sampling signals immediately preceding and immediately following said second contour point have said second and said first characteristic signal values respectively; wherein creating incremental distance signals further comprises creating said incremental distance signals at determined incremental distances along said line from said sampling point immediately preceding said second contour point until a so-created incremental distance signal has said first characteristic signal value; and wherein said step of computing said distance signals comprises computing said first distance signal, and further computing said second distance signal as a function of the number of sampling signals created before the sampling signal at said location immediately preceding said second contour point and the number of incremental distances signals following said sampling signal immediately preceding said second contour point.

4. A method as set forth in claim 1, wherein said first and second scannable characteristic values are optical values; and wherein said step of scanning said line comprises opto-electrically scanning said line.

5. A method as set forth in claim 4, wherein said sampling signals are binary signals, the absence and presence of a signal respectively corresponding to said first and second characteristics signal value.

6. System for generating distance signals signifying the distance along a line from a determined starting location of a contour point on the contour of a plane form on a background surface, said surface having a first scannable characteristic value at all points inside said contour and a second scannable characteristic value at all points outside said contour, comprising, in combination, sampling means for scanning said line and creating a plurality of sampling signals each having a first or second characteristic signal value in correspondence to the value of said scannable characteristics at sampling points spaced at predetermined intervals along said line, whereby a change from said first to said second characteristic signal value occurs following the one of said sampling signals created at the one of said sampling points immediately preceding said contour point along said line; means for creating incremental distance signals at determined incremental distances less than said predetermined intervals along said line from said one of said sampling points until a so-created final incremental distance signal has said second characteristic signal value; and computer means connected to said sampling means for computing said distance signal as a function of the number of sampling signals preceding said one of said sampling signals and the number of incremental distance signals from said one of said sampling signals to said final incremental distance signal.

7. A system as set forth in claim 6, wherein said first and second scannable characteristic values are a first and second optical value, respectively; wherein said sampling means comprise a television camera having a photo-electric converting plane and having an image of said plane form focused on said photo-electric converting plane, said television camera further having means for furnishing video signals having a first and second value, respectively, at points inside and outside of said image of said plane form on said photo-electric converting plane, and analogue-digital converter means connected to said television camera for furnishing binary signals in response to said video signals at predetermined time instants during said scanning of said line under control of synchronizing signals; wherein said sampling means further comprise synchronizing means connected to said television camera and said analogue-digital converter means for furnishing said synchronizing signals to said analogue-digital converter means only when said television camera scans said sampling points; and wherein said means for furnishing incremental distance signals comprise translating means for changing the position of said image on said photo-electric converting plane relative to the timing of said synchronizing signals in such a manner that said synchronizing signals occur when said television camera is scanning points at said determined incremental distances from said sampling points.

8. A system as set forth in claim 7, wherein said translating means comprise means for moving said camera one of said determined incremental distances along said line following each scanning thereof, whereby the position of said image changes by said determined incremental distance with respect to said starting point.

9. A system as set forth in claim 7, wherein said translating means comprise delay circuit means interconnected between said synchronizing means and said analogue-digital converter means, for delaying said synchronizing signals by a determined time interval corresponding to said determined incremental distance.

10. A system as set forth in claim 7, wherein said analogue-digital converter means comprise means for furnishing a threshold signal, and comparator means, connected to said means for furnishing video signals and said means for furnishing a threshold signal for comparing said video signals to said threshold signals and furnishing a pulse whenever the amplitude of said video signal exceeds the amplitude of said threshold signal.

11. A system as set forth in claim 7, wherein said synchronizing means comprise high frequency oscillator means for furnishing a high frequency signal, the frequency of said high frequency signal corresponding to an integral multiple of the horizontal synchronizing frequency of said television camera, first frequency divider means connected to said high frequency oscillator means for creating said horizontal synchronizing signals in response to said high frequency signal, second frequency divider means connected to said high frequency oscillator means for creating vertical synchronizing signals in response to said high frequency signal, and means for connecting the outputs of said first and second frequency divider means to said television camera.

12. A system as set forth in claim 11, wherein said computer means further comprise a means for furnishing line control signals each signifying a determined line to be scanned; and wherein said synchronizing means further comprises counting means connected to the output of said first frequency divider means for counting said horizontal synchronizing signals from the start of each of said vertical synchronizing signals and furnishing a counting signal signifying the number of so-counted signals, and coincidence circuit means interconnected between said counting means and said computer means for furnishing a coincidence signal when said counting signal corresponds to said line control signal.

13. A system as set forth in claim 8, wherein said computer means computes a distance signal in accordance with the following equation:

$$l_1 = l \frac{s_1 - 1}{n - 1} + \Delta x_1$$

where "$l$" is the length of said line, "$n$" is the number of sampling points along said line, "$s_1$" is the number of sampling signals up to and including said one of said sampling signals preceding said contour point, and "$\Delta x_1$" is the total distance said moving means has moved said camera along said line.

14. A system as set forth in claim 13, wherein said computer means further computes said second contour point in accordance with the following equation:

$$L_2 = l\frac{(s_1+s_2)-1}{n-1} + \Delta x_1$$

where "$s_2$" is the number of sampling signals having said second characteristic signals value.

15. A system as set forth in claim 9, wherein said computer means computes said distance signals signifying said location of said contour points in accordance with the following equations:

$$L_1 = \frac{l}{n-1}(s_1-1 + \frac{\alpha_1 Td}{T})$$

$$L_2 = \frac{l}{n-1}\left\{(s_1+s_2)-1 + \frac{\alpha_2 Td}{T}\right\}$$

where "$l$" is the length of the sweeping line; "$n$" is the number of the sampling points $X_0 - X_{n-1}$; "$\alpha_1$" and "$\alpha_2$" are the shifting amounts required for inverting the pulses close to the contour points; "$T$" is the period of pulse; "$Td$" is said determined time interval, herein referred to as a determined time interval, and "$s_1$", "$s_2$" and "$s_3$" are the number of binary "0"s and "1"s as found in the initial sweep and as counted from the left end.

\* \* \* \* \*